Patented June 27, 1939

2,164,101

UNITED STATES PATENT OFFICE 2,164,101

TREATING GUT

Nicholas M. Adams, Chicago, Ill., assignor to Wilson & Company, a corporation of Delaware No Drawing. Application July 19, 1937,
Serial No. 154,514

6 Claims. (Cl. 149—5)

This invention relates to a treated gut and a method of preparing the same.

Animal gut, particularly sheep's gut, has long been used for the manufacture of medical sutures and racket strings, such as tennis strings and the like. As is well known, such material, particularly tennis gut, is subjected to unfavorable physical conditions throughout its life, and such tennis strings are particularly characterized by their tendency to fray and break. By means of the present invention it is possible to produce a gut which will form a string having materially greater tensile strength than heretofore possessed by gut of similar quality and at the same time having much less tendency to fray.

In accordance with this invention, gut which has been cleaned and split, either before or after bleaching, is tanned with a synthetic tanning agent, preferably one of the compounds known as "Syntans". A satisfactory material of this type is described in U. S. Patent 1,989,802. Such a tanning agent is prepared by heating naphthalene with sulfuric acid until the naphthalene has dissolved and then adding salicyclic acid under proper temperature conditions together with formaldehyde, after which sodium carbonate is added to neutralize.

The casings prepared as above described are tanned with such a material, with or without the addition of other tanning agents, preferably by treatment in a bath at a pH between 2.0 and 5.0. Less complete tanning may be obtained at pH's above 5.0.

Apparently the tanning agent enters into a true chemical combination with the collagen by interaction of the sulfonic groups with the amino group of the collagen, although the reaction may be one, at least in part, of adsorption.

Other syntans such as toluene sulfonic acid with formaldehyde, sulfonated phenol formaldehyde and other similar agents may be employed. Other acids than salicyclic may be employed to determine the pH, for example acetic. Preferably a monobasic acid is employed to depress swelling.

As an example of the invention, split casings were placed in a bath comprising 1 lb. of the syntan to 5 gallons of water for each 150 lb. of wet gut, at 4 pH at a temperature between 35 and 50° F., preferably 40° F., and maintained in this bath for about 18 hours while agitated. Thereafter the casings were removed and washed to 7 pH and then dried, twisted and finished as usual.

In the preparation of string material a plurality of split casings are twisted together to form a string.

In the manufacture of sausage casings the gut is normally dried, cut and two strips sewed together to form a sausage casing. In some cases, the sausage casing is treated in its natural form.

The resulting tennis product has a fibre slippage which is extremely desirable for producing strength and durability in string products. As a result the product has a tensile strength about 10% greater than the same split casing treated in a normal manner. This increased strength may be due to the fact that the fibre does not have a cross-sectional shrinkage compared to untanned gut, when tanned in this manner. The product has a definitely different hardness and body than a normal product and resists cutting and slippage in a tennis racket and the tendency to fray is less, due to the increased toughness and hardness. Ordinary chrome tanning and vegetable tanning materials alone do not produce these advantages, but cause cross-sectional shrinkage.

The addition of chrome tanning and vegetable tanning agents to the synthetic tanning bath is not generally harmful, however, and in some cases is desirable.

The invention is also of value for other casing materials, for example preparing sausage casings. In the case of sausage casings, similar advantages are obtained.

What I claim as new and desire to secure by Letters Patent is:

1. The method of preparing animal gut which comprises immersing raw gut in an aqueous bath including a water soluble synthetic tanning agent for a period of at least several hours at a temperature of the order of 35–50° F. to produce a toughened body throughout having upon drying a substantially greater tensile strength than the untreated gut.

2. The method as set forth in claim 1 in which the tanning agent is a sufonated aromatic compound condensed with an aldehyde.

3. The method as set forth in claim 1 in which the temperature of the bath is maintained at from 35–50° F. and the pH of the bath is maintained at the order of 2.0–5.0.

4. Animal gut having the collagen thereof materially toughened by the process of claim 1.

5. The method as set forth in claim 1 in which the tanning agent is present in a substantial molecular excess with respect to the collagen.

6. A racket string comprising a plurality of threads of cured split gut twisted together, said gut having been toughened by the process of claim 1 prior to the twisting operation.

NICHOLAS M. ADAMS.